United States Patent
Redel

(10) Patent No.: US 9,638,223 B2
(45) Date of Patent: *May 2, 2017

(54) FASTENING SYSTEM FOR MOUNTING SOLAR MODULES

(71) Applicant: Mounting Systems GmbH, Rangsdorf (DE)

(72) Inventor: Mark Redel, Blankenfelde-Mahlow (DE)

(73) Assignee: MOUNTING SYSTEMS GMBH, Rangsdorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/834,565

(22) Filed: Aug. 25, 2015

(65) Prior Publication Data

US 2015/0362220 A1 Dec. 17, 2015

Related U.S. Application Data

(62) Division of application No. 14/108,858, filed on Dec. 17, 2013, now Pat. No. 9,147,986.

(Continued)

(30) Foreign Application Priority Data

Dec. 20, 2012 (DE) .................. 20 2012 012 462 U

(51) Int. Cl.
*E04D 13/18* (2014.01)
*E04H 14/00* (2006.01)
(Continued)

(52) U.S. Cl.
CPC .............. *F16B 2/04* (2013.01); *F24J 2/5203* (2013.01); *F24J 2/526* (2013.01); *F24J 2/5207* (2013.01); *F24J 2/5209* (2013.01); *F24J 2/5256* (2013.01); *F24J 2/5258* (2013.01); *H01R 25/142* (2013.01); *H02S 20/23* (2014.12);
(Continued)

(58) Field of Classification Search
CPC ........ F24J 2/5207; F24J 2/5203; F24J 2/5256; F24J 2/526; F24J 2/5258; F24J 2/5209; F24J 2002/5226; F24J 2002/4665; F24J 2002/5215; H02S 20/23
See application file for complete search history.

(56) References Cited

U.S. PATENT DOCUMENTS 7,592,537 B1 * 9/2009 West ...................... F24J 2/5211
136/251
7,780,472 B2 8/2010 Lenox
(Continued)

FOREIGN PATENT DOCUMENTS

DE 202005015455 U1 2/2007
DE 202009000916 U1 4/2009
(Continued)

*Primary Examiner* — Joshua J Michener
*Assistant Examiner* — Keith Minter
(74) *Attorney, Agent, or Firm* — Ware, Fressola, Maguire & Barber LLP

(57) ABSTRACT

The invention relates to a profile rail, a clip holder, a cross-connector and an attachment system for mounting solar modules. The components are so designed and matched to each other that solar modules in many variations can be mounted quickly and easily and with the components having a low weight.

6 Claims, 6 Drawing Sheets

Related U.S. Application Data

(60) Provisional application No. 61/740,032, filed on Dec. 20, 2012.

(51) Int. Cl.

| | | |
|---|---|---|
| *F16B 2/04* | (2006.01) | |
| *F24J 2/52* | (2006.01) | |
| *H01R 25/14* | (2006.01) | |
| *H02S 20/23* | (2014.01) | |
| *F24J 2/46* | (2006.01) | |

(52) U.S. Cl.
CPC *F24J 2002/4665* (2013.01); *F24J 2002/5215* (2013.01); *F24J 2002/5226* (2013.01); *Y02E 10/47* (2013.01); *Y10T 403/60* (2015.01)

(56) References Cited

U.S. PATENT DOCUMENTS

| | | | |
|---|---|---|---|
| D627,717 S * | 11/2010 | Munoz | D13/102 |
| 9,097,443 B2 * | 8/2015 | Liu | F24J 2/5258 |
| 2010/0276558 A1 | 11/2010 | Faust et al. | |
| 2011/0138585 A1 * | 6/2011 | Kmita | F24J 2/5258 |
| | | | 24/522 |
| 2011/0174360 A1 | 7/2011 | Plaisted et al. | |
| 2011/0174947 A1 * | 7/2011 | Wu | F24J 2/5205 |
| | | | 248/226.11 |
| 2011/0239546 A1 * | 10/2011 | Tsuzuki | F24J 2/4614 |
| | | | 52/11 |
| 2011/0260027 A1 * | 10/2011 | Farnham, Jr. | 248/309.1 |
| 2012/0138764 A1 * | 6/2012 | Kemple | F24J 2/465 |
| | | | 248/316.1 |
| 2012/0167364 A1 | 7/2012 | Koch et al. | |
| 2012/0193310 A1 * | 8/2012 | Fluhrer | F24J 2/5203 |
| | | | 211/41.1 |
| 2012/0267490 A1 | 10/2012 | Haddock et al. | |
| 2013/0313209 A1 | 11/2013 | Barth | |
| 2013/0320166 A1 | 12/2013 | Kemple et al. | |
| 2014/0259622 A1 * | 9/2014 | Alkas | G09F 15/0068 |
| | | | 29/525.01 |

FOREIGN PATENT DOCUMENTS

| | | |
|---|---|---|
| DE | 102009030799 A1 | 7/2011 |
| DE | 20 2011 107843 U1 | 11/2011 |
| DE | 20 2012 005671 U1 | 7/2012 |
| EP | 2 194 205 A1 | 6/2010 |
| EP | 2 410 190 A1 | 1/2012 |
| EP | 2604949 A1 | 6/2013 |
| EP | 2698828 A1 | 2/2014 |
| EP | 2789931 A1 | 10/2014 |
| FR | 2 950 375 A1 | 3/2011 |
| KR | 200 451 576 Y1 | 12/2010 |
| WO | 2010/112049 A1 | 10/2010 |
| WO | 2010/133242 A1 | 11/2010 |
| WO | 2011/058559 A2 | 5/2011 |
| WO | 2011/066843 A2 | 6/2011 |
| WO | 2011/154019 A1 | 12/2011 |
| WO | 2012/110068 A1 | 8/2012 |
| WO | 2012/116777 A2 | 9/2012 |
| WO | 2013/037384 A1 | 3/2013 |

* cited by examiner

FASTENING SYSTEM FOR MOUNTING SOLAR MODULES

CROSS REFERENCE TO RELATED APPLICATIONS

This application is a divisional of co-pending patent application Ser. No. 14/108,858 filed on Dec. 17, 2013, which claims priority under 35 USC §119 to U.S. Provisional Patent Application No. 61/740,032 filed on Dec. 20, 2012 and also claims priority under 35 USC §119 to German Patent Application No. 20 2012 012 462.5 filed on Dec. 20, 2012. All of these applications are hereby incorporated by reference in their entirety.

TECHNICAL FIELD

The invention relates to a profile rail, a clip holder, a cross-connector and an attachment system for mounting solar modules.

BACKGROUND OF THE INVENTION

Solar modules, for example photovoltaic modules for generating electrical energy, or collector modules for heating thermal transfer media, are usually secured, when mounted on rooftops or on the ground, to profile rails arranged parallel to each other.

Mounting systems for solar modules must meet many different requirements. For example, they must be sufficiently strong to hold the modules, yet simultaneously have as little weight as possible so as not to exceed the load limits of roofs. It should also be possible to deploy the system as variably as possible on different substrates and it should also permit quick and easy mounting.

The object of the present invention is therefore to provide an improved mounting system which meets all these different kinds of requirements.

A first aspect of the present invention relates to a profile rail which comprises, in a cross-sectional view:
- a support surface forming a flat bottom side of the profile rail,
- a first and a second receiving space, each having a lateral opening, said openings facing in opposite directions,
- a third receiving space in the form of a T-slot having an opening facing away from the bottom side of the profile rail, said opening being defined by two webs which are mirror-symmetrical relative to a mentally conceived center plane and which are each cranked inwards at their respective free end,
- a first rectangular, central hollow space, enclosed on all sides, which is defined by the support surface and by the first, second and third receiving space, and
- a first and a second hollow lateral space, enclosed on all sides, arranged on opposite sites of the third receiving space and each adjoining one of the first and second receiving spaces.

The profile rail according to the present invention is particularly light, yet is also very stable. Profile rails generally account for up to 98% of the weight of attachment systems for solar modules, a reduction in the weight of the profile rails has a strong effect on the total load exerted by an attachment system. Due to the third receiving space being designed in the form of a T-slot with webs having cranks, the profile rail according to the invention is suitable not only for receiving special components with hooks, but also for receiving standard connectors, such as T-head bolts and trapezoidal nuts, and thus for quick and easy mounting.

A particularly advantageous embodiment of the profile rail is one in which the height of the first central rectangular hollow space above the support surface is greater than the height of the first and the second receiving space above the support surface, such that the first central hollow space overlaps the first and the second lateral hollow space on either side. This gives the profile rail additional stability.

It is also advantageous when the first and second receiving spaces are likewise designed in the form of a T-slot, as this allows not only special components but also standard connectors such as T-slot bolts and trapezoidal nuts to be used for mounting.

It is also advantageous when the profile rail has lateral external walls which have a toothed profile in whole or in part. By using toothed profiles, it is possible to prevent abutting components from slipping, especially during the mounting process.

A second aspect of the invention relates to a clip holder, comprising:
- a head plate having a threaded hole and
- two legs laterally disposed on the head plate, wherein the ends of said legs, facing away from said head plate, have hooks which are designed to engage cranks in the profile rail.

Such a clip holder can be inserted into the third receiving space in the inventive profile by exerting slight pressure and can still be moved within the rail until final mounting. This can be carried out in a particularly advantageous manner using a clip holder in which the hooks slope inwards to an inner side of the respective leg by an angle of 15° to the horizontal. If a module is seared with the aid of such a clip holder and a screw, the screw fastens itself into the clip holder inserted into the profile rail, and said clip holder secures itself as a result of the hooks sloping at an angle of 15°.

In one advantageous variant of the invention, the head plate of the clip holder is square in the plan view. With the aid of such clip holders, the profile rails can be arranged in a particularly advantageous manner at an angle of 90° to the solar modules, and also in the joint between two modules.

A third aspect of the invention relates to a cross-connector which comprises, in a cross-sectional view:
- a middle web having a right-angled end and a beveled end,
- a first L-shaped extension attached to the middle web closer to the right-angled end than to the beveled end, and
- a second L-shaped extension attached to the middle web closer to the beveled than to the right-angled end and attached to the side of the middle web opposite the first L-shaped extension.

The cross-connector allows profile rails arranged perpendicular to each other to be joined together easily and securely.

A fourth aspect of the invention relates to an attachment system for solar modules, comprising:
- a number of profile rails according to the invention and
- a plurality of clip holders according to the invention, in which the hooks have shapes complementary to the cranks in the profile rails, wherein the plurality of clip holders are inserted in the third receiving spaces of the profile rails and the hooks of the clip holders engage the cranks in the profile rails and wherein retention members are secured to the clip holders by means of screws inserted into the threaded holes.

Such an attachment system has a lower weight than solutions known hitherto, and it is possible with such an attachment system for solar modules to be mounted quickly and straightforwardly. The profile rails are mounted on a roof or a stand structure, after which the first solar modules can be put in place. The clip holders are then inserted with slight pressure into the third receiving space of the profile rails and can then be brought to their final position by sliding them accordingly. Other adjacent solar modules can then be mounted and, by tightening the screws, the solar modules can be collectively fixed in place using the retention members. However, the attachment system according to the invention also allows all the solar modules to be put in place to begin with, after which the clip holders with retention members attached thereto are inserted between the adjacent solar modules.

In one advantageous development of the invention, the attachment system includes at least two profile rails arranged perpendicular to each other in such a way that a cross-connector having the first L-shaped extension according to the invention is received in the first or in the second receiving space of the one profile rail and is secured by use of the second L-shaped extension by means of a screw to a clip holder which for its part is inserted in the third receiving space of the second profile rail. A secure connection between profile rails arranged perpendicular to each other can thus be achieved in an easy manner.

To install larger areas of solar modules, the profile rails can be joined together, in another advantageous development of the attachment system according to the invention, via a telescopic connector which is received in the first central hollow space in each of the two profile rails. In its simplest form, said telescopic connector is manufactured in the form of a square tube, the outside dimensions of which correspond to the inside dimensions of the first central hollow space of the profile rails being connected.

The advantages specified above in respect of the profile rails, the clip holder or the cross-connector also apply for an attachment system according to the fourth aspect of the invention.

BRIEF DESCRIPTION OF THE DRAWINGS

Other features and advantages shall become obvious from the following embodiments described below with reference to the Figures, in which.

DETAILED DESCRIPTION

Figure 1:
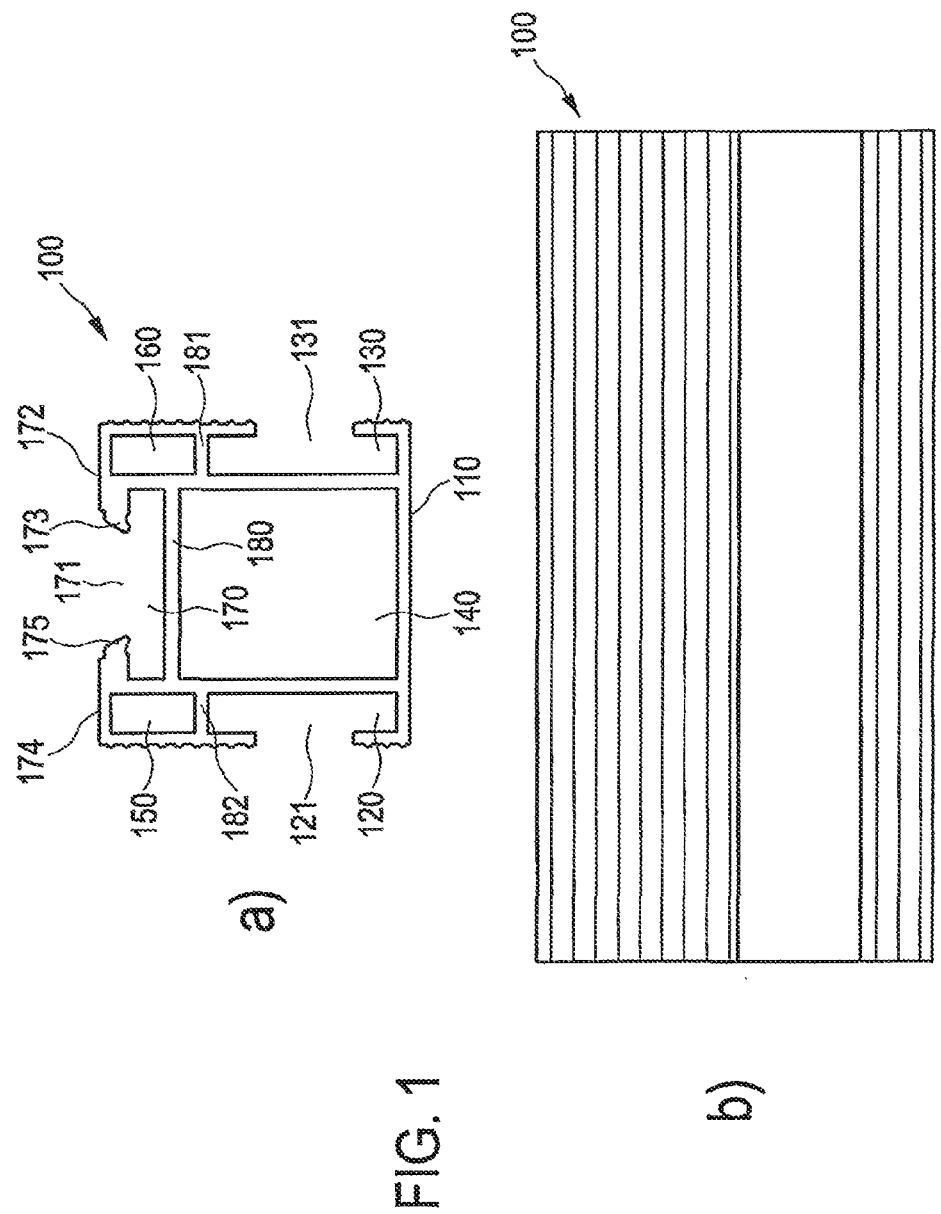
FIG. 1 shows a profile rail according to the first aspect of the invention.

FIG. 1 shows a profile rail 100 for mounting solar modules according to the first aspect of the invention. In FIG. 1a, profile rail 100 is shown in a cross-sectional view, in FIG. 1b in a side elevation view. Profile rail 100 has a support surface 110 forming a bottom side of the profile rail. Above said support surface, a first receiving space 120 and a second receiving space 130 are arranged, each of which having a lateral opening 121 and 131 and being embodied in the form of a T-slot. A first rectangular central hollow space 140 is disposed between the first and the second receiving space 120, 130 above support surface 110. This hollow space serves to provide stability to the profile rail as a whole, while at the same time minimizing the weight, and connecting members such as telescopic connectors can be attached inside the hollow space. A first lateral hollow space 150 or second lateral hollow space 160 is formed above the first and second receiving space, respectively. Above the first central hollow space 140 and between the first lateral hollow space 150 and the second lateral hollow space 160, a third receiving space 170 is provided in the form of a T-slot. The third receiving space 170 has an opening 171 which faces away from the bottom side of the profile rail, said opening being defined by two webs 172, 174 which are mirror-symmetrical relative to a mentally conceived center plane and which each have a crank 173, 175 at their respective free end. By designing the third receiving space in the form of a T-slot, and providing the webs which define the opening with cranks, the profile rail is suitable not only for receiving clip holders according to the invention, but also for receiving standard connectors.

As the height of the central hollow space 140 above the support surface is greater in the embodiment shown here than the height of the first and the second receiving space 120, 130, the first and second lateral hollow spaces 150, 160 are also adjacent the first central hollow space. The bottom walls 181, 182 of lateral hollow spaces 150, 160 and the bottom wall 180 of the third receiving space 170 are not in the same plane, therefore, so this arrangement results in greater stability of the profile rail.

It can be seen from both FIG. 1a and FIG. 1b that the lateral external walls of profile rail 100 are provided with a toothed profile. This profile can prevent any slippage of components during mounting, or at least impede such slippage.

Figure 2:
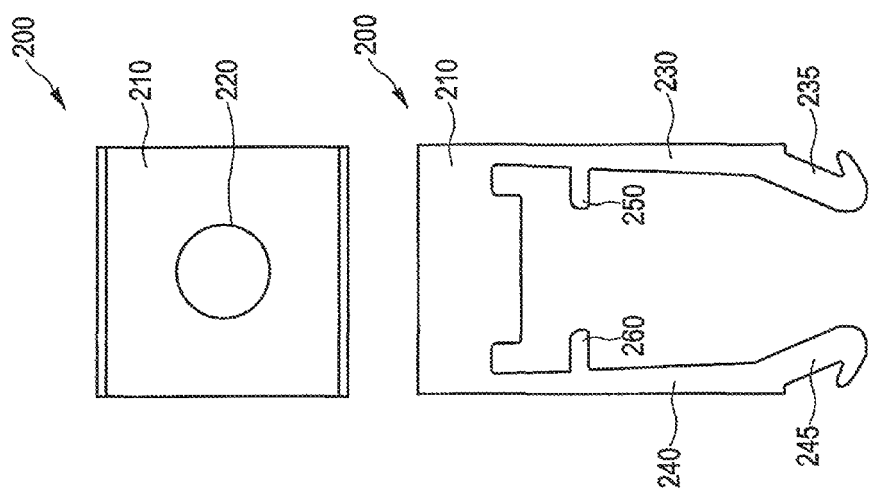
FIG. 2 shows a clip holder according to the second aspect of the invention.

FIG. 2 shows an embodiment of a clip holder 200 according to the second aspect of the invention. FIG. 2a shows the clip holder in the plan view. In FIG. 2b, clip holder 200 is shown in a side view. The clip holder has a head plate 210 which has a threaded hole 220, said head plate being square in shape in this embodiment. Due to the square shape of the head plate, the profile rails can be arranged in a particularly advantageous manner at an angle of 90° to the solar modules, and also in the joint between two modules, as shown in more detail in FIGS. 3 and 5. Two legs 230, 240 are disposed at the sides of head plate 210. At their respective ends facing away from the head plate, the legs have hooks 235, 245 which are designed to engage cranks in the profile rail. In the embodiment shown, said hooks 235, 245 slope inwards to an inner side of the respective leg by an angle of 15° to the horizontal. Such clip holders 200 can be inserted with slight pressure into the profile rail according to the invention and can still be moved therein. A web 250, 260 is provided on the inner side of each leg 230, 240. If, in the mounted state, a screw extending to webs 250, 260 has been inserted into the clip holder, the clip holder can be prevented with the aid of the webs from being pressed together.

Figure 3:
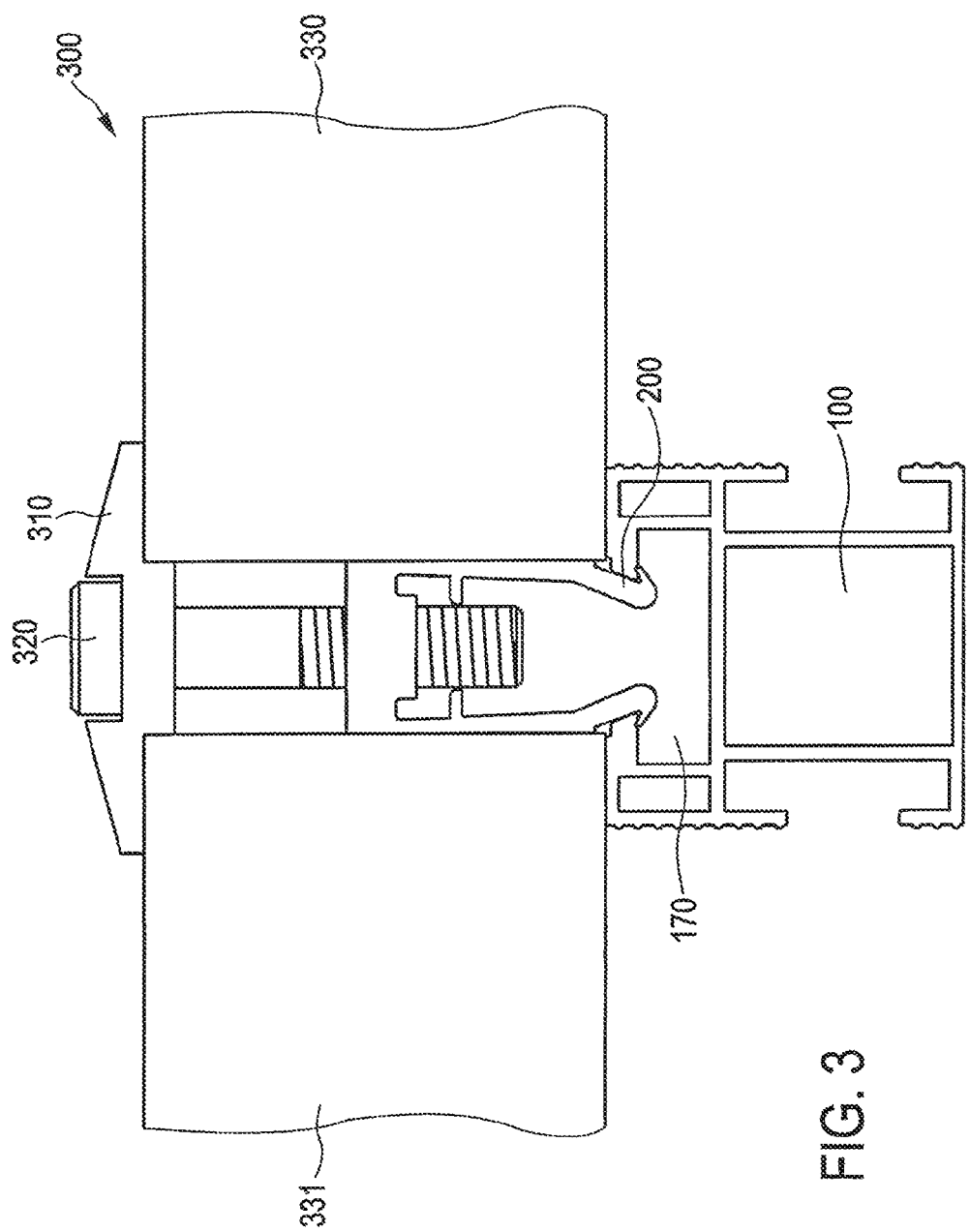
FIG. 3 shows a section of an attachment system according to the fourth aspect of the invention.

FIG. 3 shows part of an attachment system 300 according to the fourth aspect of the invention, in which the attachment system 300 as a whole has a plurality of profile rails and a plurality of clip holders. A clip holder 200 is attached here in a third receiving space 170 of a profile rail 100. The hooks at the ends of the clip holder legs engage the cranks of the webs which define the opening of the third receiving space. The hooks are complementary in shape to the cranks. A retention member 310 for holding two adjacent solar modules is fastened to clip holder 200 by means of a screw 320. Solar modules 330, 331 are securely mounted on profile rail 100 by means of retention member 310 and by tightening screw 320. With this attachment system, the solar modules can be placed on the profile rails and then fixed in place by clipping the clip holders into the profile rails. This allows quick and easy mounting.

Figure 4:
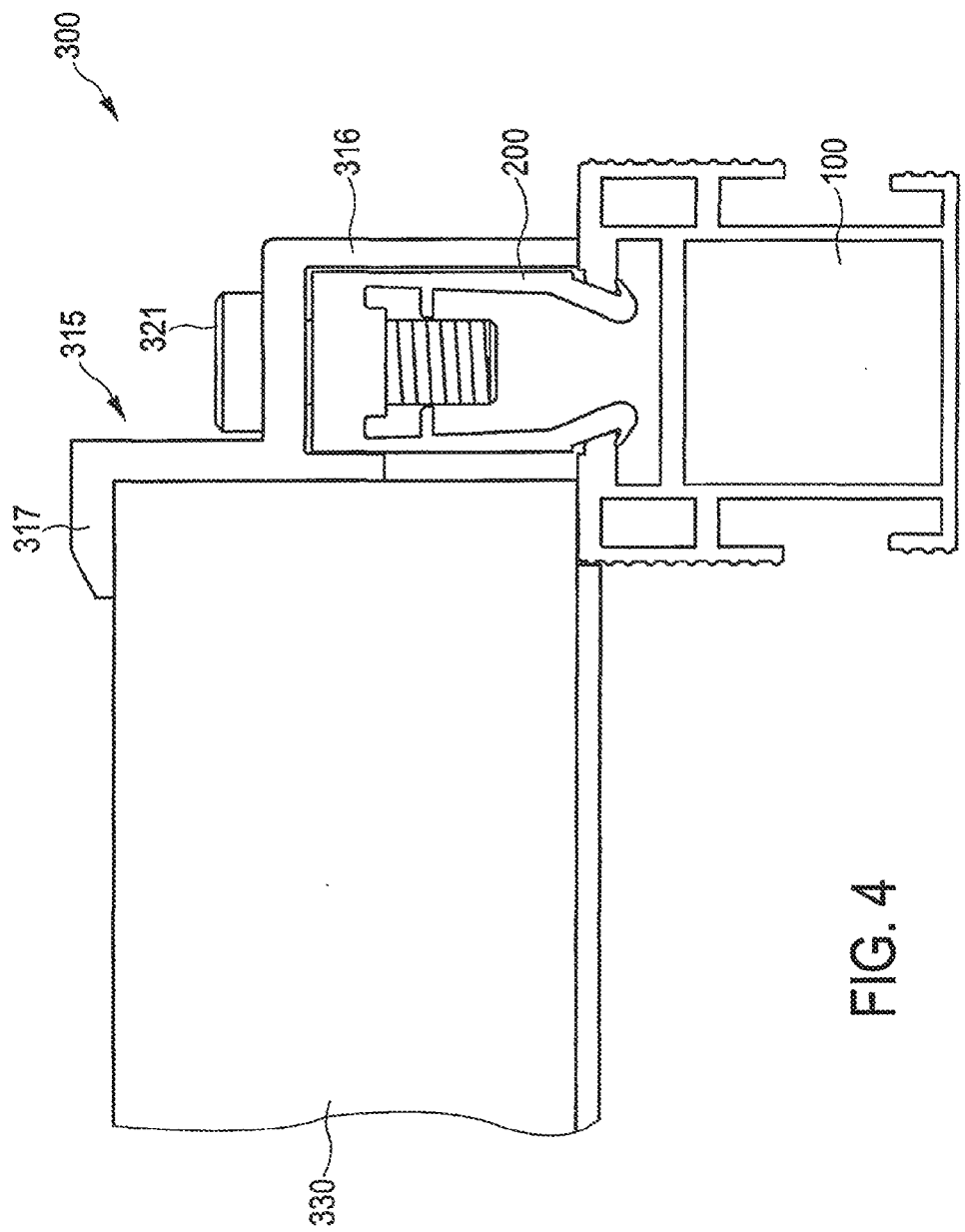
FIG. 4 shows another section of an attachment system according to the fourth aspect of the invention.

FIG. 4 likewise shows a part of attachment system 300. In this part of the attachment system, a retention member 315 for only one solar module is used instead of a retention member for holding adjacent solar modules, such a retention member also being referred to as an end retention member. In this side view, end retention member 315 consists of two L-shaped members, the short leg of the first L-shaped member 316 being formed on the long leg of the second L-shaped member 317. The end retention member encloses with the first L-shaped member 316 a clip holder 200 and is fastened thereto by means of a screw 321. Solar module 330 is held in place and pressed against profile rail 100 by means of the second L-shaped member 317. Clip holder 200 is mounted, in turn, in the third receiving space of profile rail 100. With the aid of the end retention member, the last solar modules in a row can be attached to the profile rails. As a comparison with FIG. 3 shows, screws of different length, adapted to the module height and location within the attachment system, can be used on the inventive clip holder. However, it is also possible with the clip holder according to the invention to attach solar modules of any standard frame height using one screw length, thus obviating the need for the fitter to have many different screws.

Figure 5:
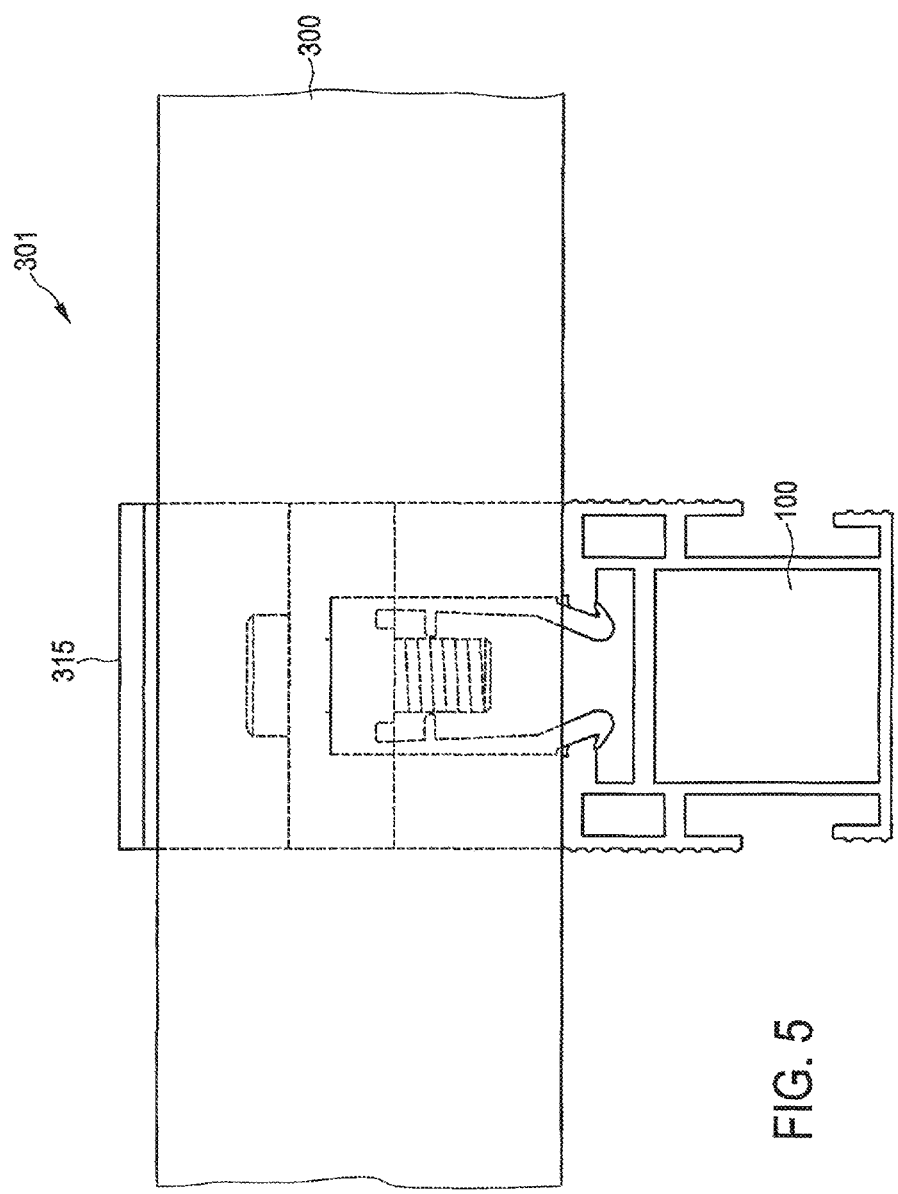
FIG. 5 shows another section of an attachment system according to the fourth aspect of the invention and FIG. 6 shows yet another section of an attachment system according to the fourth aspect of the invention.

FIG. 5 shows a part of an attachment system 301, in which profile rail 100 is arranged at an angle of 90° to solar module 330. This arrangement is common in photovoltaic systems. In this case also, solar module 330 is mounted with the aid of the clip holder on profile rail 100 using an end retention member 315.

Figure 6:
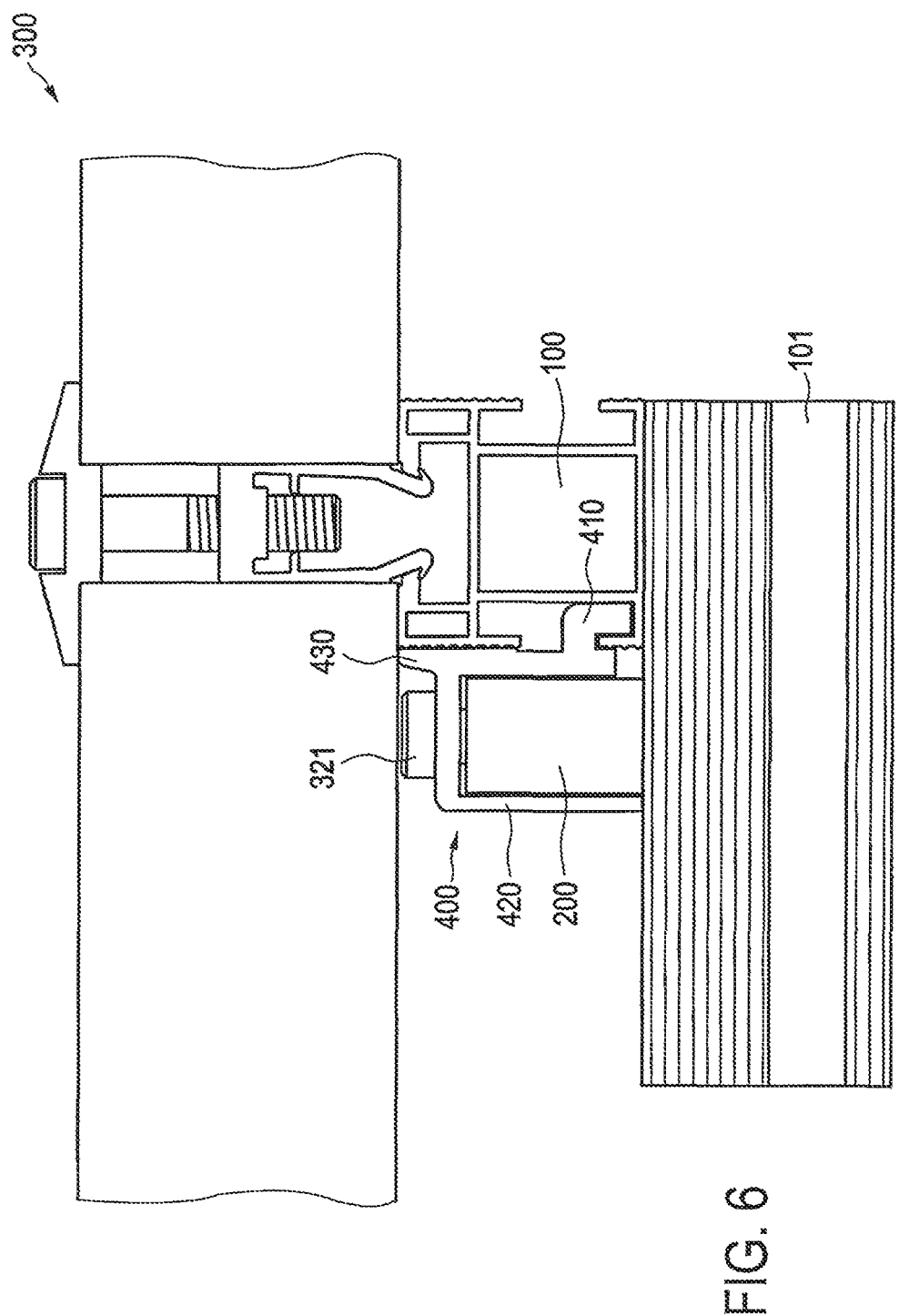

FIG. 6 shows another part of attachment system 300 in FIG. 3. In this case, a second profile rail 101 is additionally mounted perpendicular to the first profile rail 100. This is done with the aid of a cross-connector 400, the first L-shaped extension 410 of which is received in the first receiving space of the first profile rail 100. Cross-connector 400 and thus the first profile rail is fasten via the second L-shaped extension 420 by a screw 321 to clip holder 200. Clip holder 200, for its part, is inserted in the third receiving space of the second profile rail 101. Middle web 430 of the cross-connector abuts a toothed external wall of the first profile rail in a nonskid manner. In this way, a secure connection between profile rails arranged perpendicular to each other can be achieved quickly and easily.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

REFERENCE SIGNS 100, 101 Profile rail
110 Support surface
120 First receiving space
121,131 Lateral opening
130 Second receiving space
140 First inner hollow space
150 First lateral hollow space
160 Second lateral hollow space
170 Third receiving space
171 Opening
172, 174 Web
173, 175 Crank
180 Lower wall of the third receiving space
181 Lower wall of the second lateral hollow space
182 Lower wall of the third lateral hollow space
200 Clip holder
210 Head plate
220 Threaded hole
230, 240 Legs
235, 245 Hooks
250, 269 Web on clip holder
300, 301 Attachment system
310, 315 Retention member
316 First L-shaped member
317 Second L-shaped member
320, 321 Screw
330, 331 Solar module
400 Cross-connector
410 First L-shaped extension
420 Second L-shaped extension
430 Middle web

What is claimed is:

1. A profile rail for an attachment system for solar panels comprising, in a cross-sectional view:
    a support surface forming a bottommost side comprising a horizontal bottommost surface extending continuously an entire width of the profile rail,
    a first and a second receiving space, each having a lateral opening configured to receive a cross-connector of the attachment system, said openings facing in opposite directions,
    a third receiving space in the form of a T-slot having an opening facing away from the bottommost side of the profile rail, said opening being defined by two webs facing each other which are mirror-symmetrical and which each has a crank inwards at its respective free end, said third receiving space configured to receive a clip holder of the attachment system,
    a first rectangular, central hollow space, enclosed on all sides, which is defined by the support surface and by the first, second and third receiving space, and a first and a second hollow lateral space, enclosed on all sides, arranged on opposite sides of the third receiving space and each adjoining one of the first and second receiving spaces.

2. The profile rail according to claim 1, wherein the height of the first central rectangular hollow space above the support surface is greater than the height of the first and the second receiving space above the support surface, such that the first central hollow space overlaps the first and the second lateral hollow space on either side.

3. The profile rail according to claim 2, wherein the first and the second receiving space each being in the form of a T-slot.

4. The profile rail according to claim 3, having lateral external walls which have a toothed profile in whole or in part.

5. The profile rail according to claim 1, wherein the first and the second receiving space each being in the form of a T-slot.

6. The profile rail according to claim 1, having lateral external walls which have a toothed profile in whole or in part.

\* \* \* \* \*